UNITED STATES PATENT OFFICE.

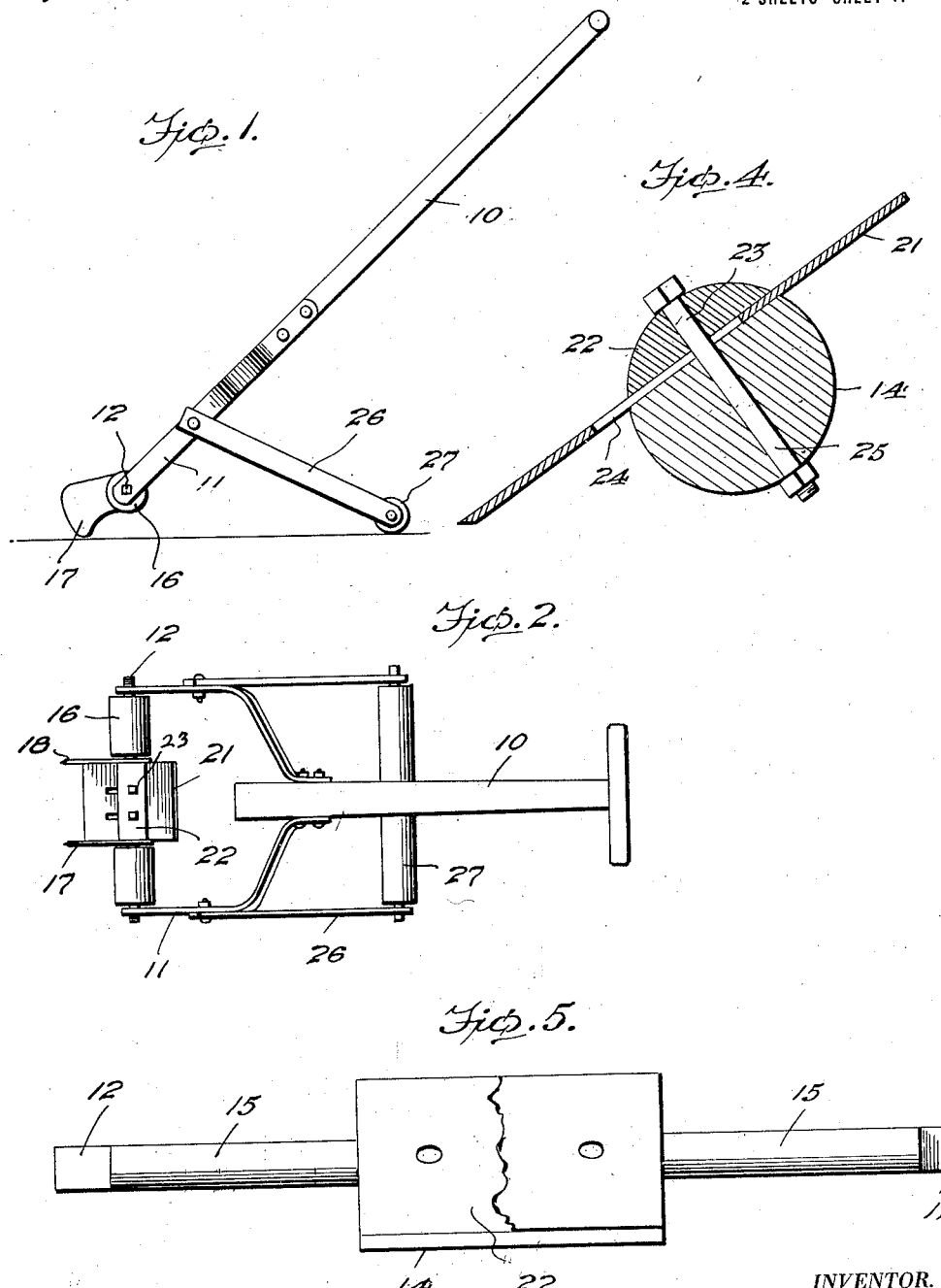

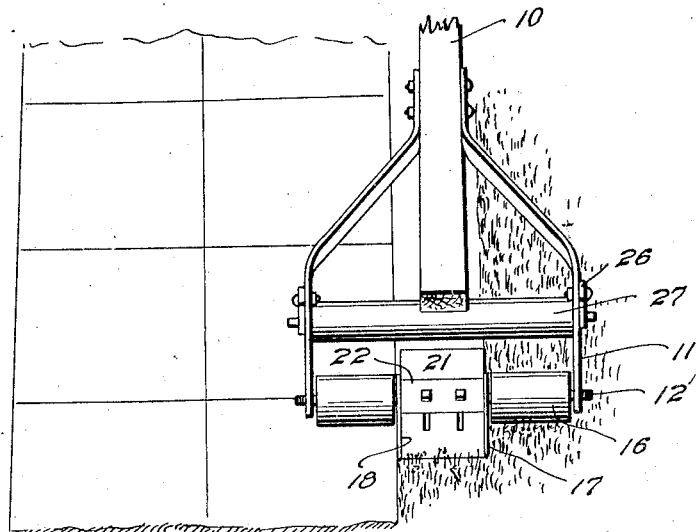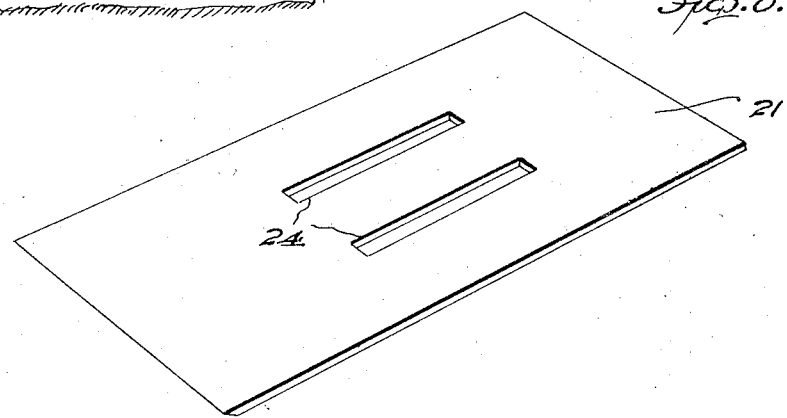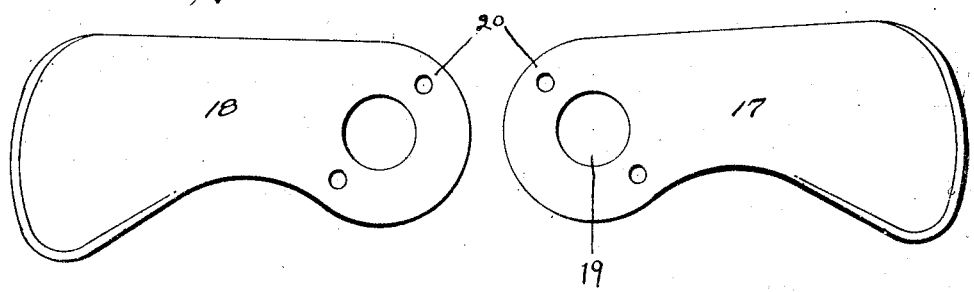

CARMELO CONIGLIO, OF PORT ARTHUR, TEXAS.

LAWN-MOWER.

1,338,123.   Specification of Letters Patent.   Patented Apr. 27, 1920.

Application filed December 5, 1919. Serial No. 342,692.

*To all whom it may concern:*

Be it known that I, CARMELO CONIGLIO, a citizen of the United States of America, residing at Port Arthur, in the county of Jefferson and State of Texas, have invented new and useful Improvements in Lawn-Mowers, of which the following is a specification.

This invention comprehends the provision of a machine designed for trimming the edge of a lawn, and embodies among other features means whereby the edge of the lawn is trimmed along a straight line, providing a groove in the ground of a predetermined depth.

To this end the invention makes use of a pair of spaced blades, arranged at an angle to the ground, one of the blades cutting the lawn at a predetermined distance from the edge of the walk, while the other blade bears against the edge of the walk to guide the machine, the intermediate blade being arranged at a right angle to the spaced blades and cutting a groove in the ground between the edge of the walk and the most remote blade.

In carrying out the invention I provide means for adjusting the intermediate blade so that a groove of a predetermined depth can be cut, and also provide for the removal of this blade from the machine when it is desired to sharpen the same.

Another important object of the invention resides in the provision of a ground engaging roller which is utilized for keeping the machine at the same level so that the knife will cut into the ground at an even depth along the entire course over which the machine is moved.

The nature and advantages of the invention will be readily understood when the following detail description is taken in connection with the accompanying drawings and wherein:

Figure 1 is a side elevation of the machine.

Fig. 2 is a top plan view.

Fig. 3 is a view of the machine showing its position with relation to the walk and the edge of the lawn when in use.

Fig. 4 is an enlarged detail sectional view taken through the axle and intermediate blade.

Fig. 5 is a detail view of the axle.

Fig. 6 is a detail view of one of the spaced blades.

Fig. 7 is a similar view of the other of said spaced blades.

Fig. 8 is a detail view of the intermediate blade.

Referring to the drawings in detail, the machine comprises a yoke carried by one end of the handle 10, the sides 11 of the yoke having openings to receive the squared extremities 12 of the axle, the design of which is shown in Fig. 5. The axle is formed with an enlarged intermediate portion of substantially rectangular formation in cross section indicated at 14, while the portions of the axle between the intermediate portion 14 and the extremities 11 are rounded as at 15. Loosely mounted upon the portions 15 of the axle are ground wheels 16.

A pair of spaced blades are indicated at 17 and 18 respectively, each having an opening 19 for the reception of the rounded portion of the axle, and small openings 20 for the reception of fastening elements utilized in securing the blades to the opposite ends of the enlarged central portion 14 of the axle. These blades 17 and 18 respectively are disposed edgewise, and may be of any proper design for the purposes intended. The blade 17 which is the most remote from the edge of the walk A when the machine is in use, is designed to cut the grass and earth along a straight line, while the blade 18 cuts into the ground, bearing against the adjacent edge of the walk A and serves to guide the machine in its travel, thus insuring a perfectly straight cut along the edge of the lawn.

Positioned between the blades 17 and 18 is an intermediate blade 21 arranged at a right angle to the aforementioned blades, and at an angle with respect to the ground so as to cut a groove in the latter by removing the surface or earth cut in the space between the blades 17 and 18. The blade 21 is secured upon the portion 14 of the axle by means of a plate 22 which is provided with openings 23 which aline with similar openings in the portion 14 of the axle when the parts are associated. The blade 21 is provided with spaced elongated slots 24 which coincide with the openings 23, when the blade is positioned between the axle and plate 22, the blade being secured between said parts by means of the fastening elements 25 which are passed through the openings 23 in the slots 24. By reason of this construction it is manifest that the blade 21 can be adjusted with respect to the axle by loosening the fastening elements 25, so that the blade will cut a predetermined depth.

A frame 26 is pivoted upon the yoke and carries a ground engaging roller 27. The ground engaging roller maintains the machine at the same level so that the knife 21 will cut the same depth throughout the course over which the machine is moved.

While I have shown and described what I consider the preferred embodiment of the invention I desire to have it understood that I do not limit myself in this connection, and that such changes may be resorted to when desired as fall within the scope of what is claimed.

What is claimed is:

1. A machine of the class described comprising a handle, a yoke secured to one end thereof, an axle carried by the yoke, wheels loosely mounted upon the axle, spaced blades mounted upon the axle and disposed edgewise at an inclination to the ground, and a cutting blade secured to the axle between the spaced blades at a right angle to the latter, and at an inclination to said axle.

2. A machine of the class described comprising a handle, a yoke carried thereby, an axle supported by said yoke, wheels journaled on said axle, spaced parallel blades fixed upon the axle at an inclination to the ground and disposed edgewise, a cutting blade mounted upon the axle between said spaced blades and at a right angle thereto, said cutting blade being disposed at an inclination to the ground and susceptible of adjustment toward and away from the latter with respect to said axle.

3. A machine of the class described comprising a handle, a yoke carried thereby, an axle supported by said yoke, wheels journaled upon the axle, spaced parallel blades fixed upon the axle and disposed edgewise at an inclination to the ground, a cutting blade carried by the axle and arranged between the spaced blades and at a right angle thereto, and a ground engaging roller supported from said yoke and arranged at the rear of said blades for the purpose specified.

4. A machine of the class described comprising a handle, a yoke carried thereby, an axle supported therein, rollers journaled on said axle, spaced parallel blades fixed upon the axle and disposed edgewise with respect to the ground, a cutting blade secured to the axle and arranged between the spaced blades, said cutting blade having spaced parallel slots, fastening elements for securing said blades to the axle, said elements passing through said slots and permitting said blade to be adjusted with respect to and transversely of said axle, for the purpose specified.

5. A machine of the class described comprising a handle, a yoke carried thereby, an axle supported by said yoke, wheels journaled upon the axle, spaced parallel blades fixed upon the axle and disposed edgewise and at an inclination to the ground, a cutting blade carried by the axle and arranged between the spaced blades, said cutting blade being mounted for adjustment with respect to and transversely of the axle, and disposed at an inclination to the ground, and a ground engaging roller supported from said yoke and arranged at the rear of the blades for the purpose specified.

In testimony whereof I affix my signature.

CARMELO CONIGLIO.